United States Patent [19]
Klompas

[11] 3,742,706
[45] July 3, 1973

[54] DUAL FLOW COOLED TURBINE ARRANGEMENT FOR GAS TURBINE ENGINES

[75] Inventor: Nicholas Klompas, Lynnfield, Mass.

[73] Assignee: General Electric Company, Lynn, Mass.

[22] Filed: Dec. 20, 1971

[21] Appl. No.: 209,694

[52] U.S. Cl.................. 60/39.66, 415/115, 416/97, 416/216
[51] Int. Cl.......... F02c 7/18, F01d 5/08, F01d 5/32
[58] Field of Search...................... 415/115; 416/97, 416/96, 215, 216; 60/39.23, 39.66

[56] References Cited
UNITED STATES PATENTS

| | | | |
|---|---|---|---|
| 3,635,586 | 1/1972 | Kent | 415/115 |
| 3,453,825 | 7/1969 | May | 60/39.66 X |
| 849,992 | 4/1907 | Frikart | 416/215 |
| 2,401,826 | 6/1946 | Halford | 416/216 X |
| 2,988,325 | 6/1961 | Dawson | 415/115 X |
| 3,034,298 | 5/1962 | White | 60/39.66 |

FOREIGN PATENTS OR APPLICATIONS

| | | | |
|---|---|---|---|
| 827,264 | 2/1960 | Great Britain | 416/216 |

Primary Examiner—Clarence R. Gordon
Attorney—Edward S. Roman et al.

[57] ABSTRACT

Turbine blading for a gas turbine engine includes a dual source of turbine cooling airflow wherein a portion of the high pressure compressor discharge airflow is directed to cool the most critical temperature areas of the turbine blade and a portion of the low pressure compressor interstage airflow is directed to cool the less critical temperature areas of the same turbine blade. The invention herein described was made in the course of or under a contract or subcontract thereunder (or grant) with the Department of the Navy.

8 Claims, 5 Drawing Figures

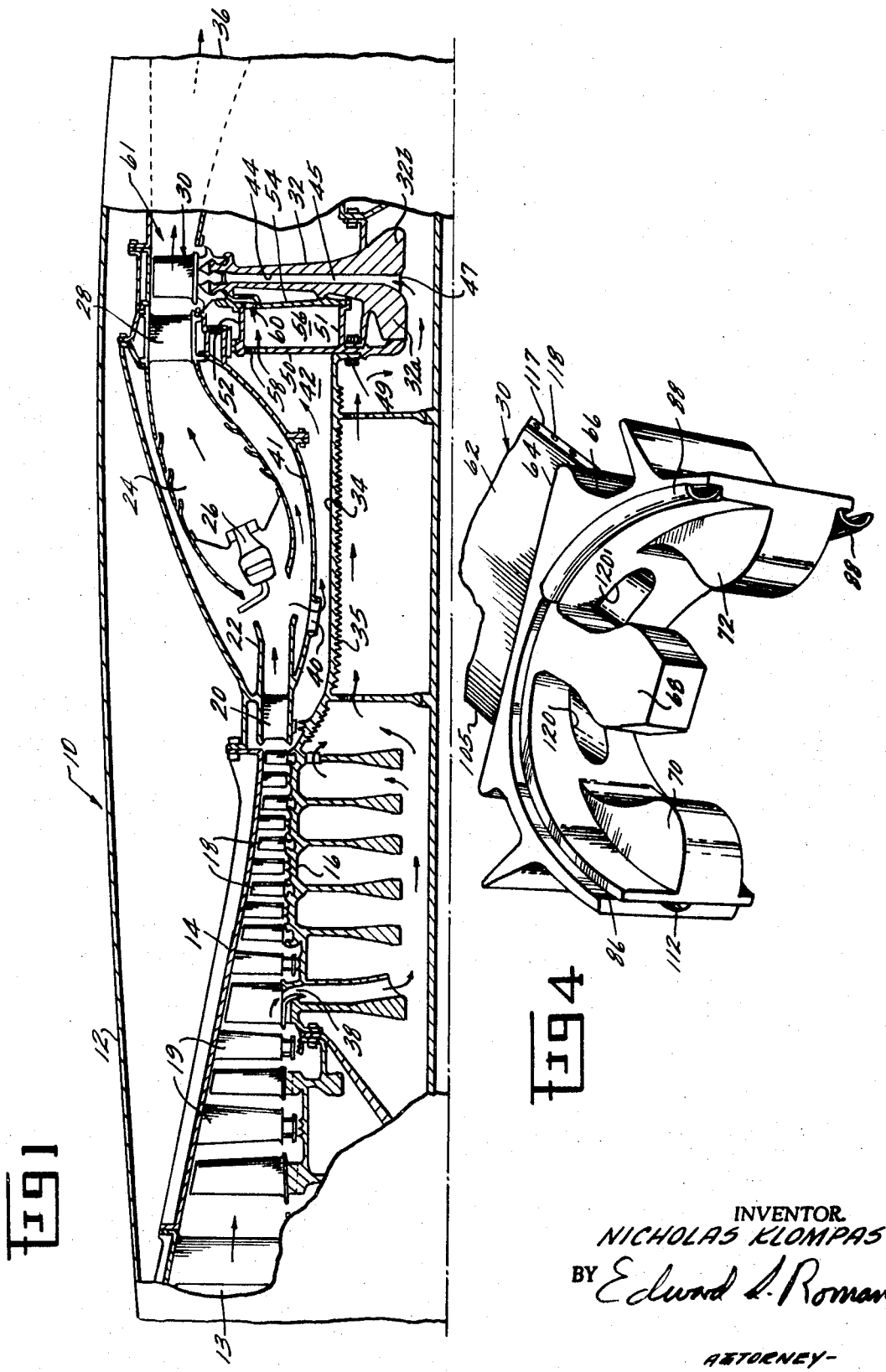

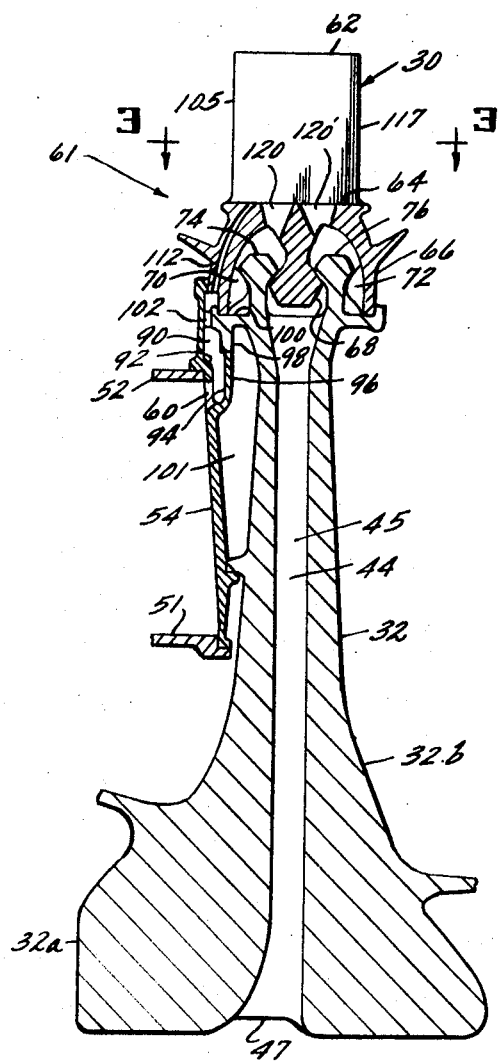
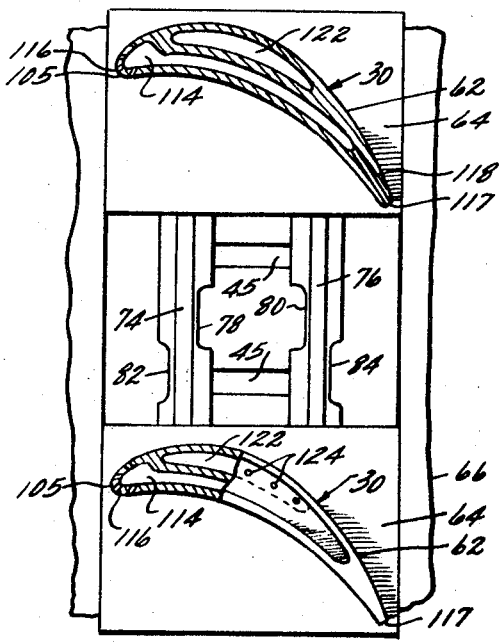
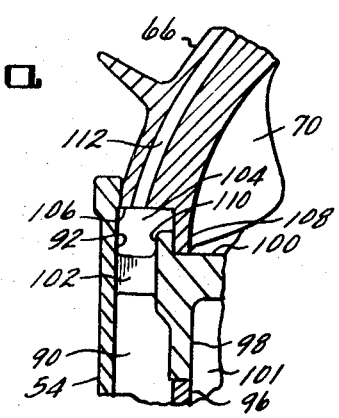
INVENTOR.
NICHOLAS KLOMPAS

DUAL FLOW COOLED TURBINE ARRANGEMENT FOR GAS TURBINE ENGINES

BACKGROUND OF THE INVENTION

In general, this invention relates to a dual flow cooled turbine arrangement for a gas turbine engine and, more particularly, to a gas turbine cooling arrangement wherein turbine cooling airflow from two distinct sources is directed to each blade of a turbine.

The power output and thermal efficiency of a gas turbine engine can be increased by increasing the temperature of the combustion gases supplied to the turbine blades. In general, however, any such increase is limited by the maximum permissible operating temperature of the turbine rotor and its blades. It has long been known to the gas turbine art that a portion of the compressor air could be utilized for cooling the turbine rotor and/or its blades. However, any use of compressor air for turbine cooling decreases the amount of compressor air available for the combustion chamber of the gas turbine, thereby decreasing the thermal efficiency of the engine. Therefore, it becomes imperative that the most efficient use be made of that portion of the compressor air which is bled for turbine cooling.

Generally, at any one instant of time there is a large variation in the pressure of the hot gases of combustion which impinge over the entire surface of each turbine blade. Critical areas of the turbine blade upon which the hot combustion gases of highest pressure impinge include the blade leading edge and the concave surface of the blade. The pressure of the hot gas stream is lowest on the convex side of each turbine blade. Therefore, it becomes inefficient to utilize a single source of cooling airflow, such as compressor discharge air, to cool each turbine blade. The high pressure compressor discharge air becomes wasted when utilized to cool the low pressure side of each turbine blade. Use of the lower pressure compressor interstage air, however, is inadequate to cool the critical areas of each turbine blade, such as the leading edge area where the pressure of the impinging hot gas stream is greatest.

Therefore, it is an object of this invention to provide a turbine cooling arrangement for a gas turbine engine wherein cooling airflow for each turbine blade is supplied from two distinct sources so as to optimize engine efficiency.

It is also an object of this invention to provide a turbine cooling arrangement for a gas turbine engine wherein high pressure cooling airflow is directed to the critical areas of each turbine blade such as the leading edge and concave surface and low pressure cooling airflow is directed to the noncritical area of each turbine blade such as the convex surface.

SUMMARY OF THE INVENTION

A dual flow cooled turbine arrangement is provided for a gas turbine engine of the type having a compressor, combustor and turbine in serial flow relation. The dual flow cooled turbine arrangement includes means for bleeding a portion of the compressor interstage airflow at a point intermediate the inlet and discharge ends of the compressor. There are further included means for bleeding a portion of the compressor airflow discharged from the compressor. The turbine includes a wheel drivably connected to the compressor together with a plurality of blades disposed in circumferentially spaced relation about the periphery of the turbine wheel. The interior of the airfoil vane of each blade is adapted to receive both compressor interstage bleed cooling airflow and compressor discharge bleed cooling airflow. Means are also included for directing the compressor interstage bleed airflow and the compressor discharge bleed airflow to the turbine blades.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side view partly in cross-section of a gas turbine engine incorporating the dual flow cooling arrangement of the invention.

FIG. 2 is an enlarged cross-sectional view of the dual flow cooled turbine included in the engine of FIG. 1.

FIG. 2A is an enlarged cross-sectional view of the cooling flow seal arrangement of the turbine of FIG. 2.

FIG. 3 is a plan view along the line 3—3 of FIG. 2 showing the dual flow cooled turbine.

FIG. 4 is a perspective view of the root portion of a turbine blade from the dual flow cooled turbine of the invention.

DESCRIPTION OF THE PREFERRED EMBODIMENTS

Referring to FIG. 1, there is shown a gas turbine engine 10 which has a cylindrical casing 12, open at one end, to provide an inlet 13 for an axial flow compressor 14. The compressor 14 comprises a rotatable drum 16 having a number of rows of axially spaced blades 18 extending from the surface of the drum 16 so as to impart a velocity pressure to the air passing thereacross. Axially spaced rows of stator vanes 19 are interposed between the rotor blades. A series of downstream outlet guide vanes 20 and a diffuser passageway 22 enable the static pressure of the air to be increased for discharge to a combustor 24. Fuel is injected into the combustor 24 through a series of fuel nozzles 26 and the resultant mixture ignited to increase the energy level of the gases. Pressurized fuel is supplied to the nozzles 26 from a source which is not shown. The hot gases of combustion are discharged through a turbine inlet nozzle 28 and through the turbine blades 30 disposed about the outer periphery of a turbine wheel 32 which drives the compressor through an interconnecting shaft 34. The hot gases of combustion are discharged through a conventional exhaust nozzle (not shown) downstream of the numeral 36 to produce a propulsive thrust for the engine 10.

In order to cool the turbine blades and wheel, cooling air is bled from an interstage area of the compressor and from the discharge area of the compressor. Compressor interstage air is bled from the compressor interstage air bleed port 38, whereupon it is directed toward and aft end of the engine through the interior of the interconnecting shaft 34.

Referring now to the area of the compressor discharge there can be seen a combustor air bleed port 40 from whence a portion of the compressor discharge air is bled. The bleed port 40 provides flow communication through an interior cylindrical partition 41 which is spaced radially outward of the interconnecting shaft 34, and cooperates therewith to define an axially extending annular plenum 42 for directing the compressor discharge bleed cooling air to the aft end of the engine.

Compressor discharge air is generally at a higher temperature than compressor interstage air due to the increased work of compression. Heat from the higher temperature compressor discharge bleed air is transferred through the interconnecting shaft 34 by means of cooling fins 35 to the cooler compressor interstage bleed air so that the shaft 34 serves the dual function of a heat exchanger. The interconnecting shaft 34 provides an extremely efficient heat exchanger due to its high speed rotation which provides for high heat transfer coefficients at both the inner and outer surfaces thereof, together with strong convection currents through the shaft 34. Heat transfer through the shaft 34 precools the hot compressor discharge bleed cooling air, thus substantially reducing the quantity of compressor discharge bleed air required to perform the necessary cooling. Heat added to the cool compressor interstage bleed air necessitates an increase in the amount of interstage air which would otherwise be adequate. However, the reduction in the quantity of discharge bleed air outweighs the required increase in quantity of interstage bleed air thereby effecting an overall increase in cooling flow efficiency. The ratio of compressor interstage bleed cooling air to compressor discharge bleed cooling air can be optimized for maximum engine cycle efficiency.

Referring now to the turbine wheel 32, it can be seen that the center of the wheel 32 is made hollow so as to include a radially extending annular plenum 44 for receiving the compressor interstage bleed cooling air. The rotor wheel 32 may comprise two axially spaced rotor discs 32A and 32B interconnected by means of a plurality of circumferentially spaced vanes 45 which extend radially outward, and may be formed integral with either one or both of the discs 32A, 32B. Compressor interstage cooling air enters an annular inlet 47, whereupon the vanes 45 then function to centrifuge and pump the cooling air toward the turbine blades 30. The turbine wheel 32 is fixedly attached to the interconnecting shaft 34 by means of a plurality of circumferentially spaced locking bolts 49.

Intermediate the rotor wheel disc 32A and the interconnecting shaft 34, and fixedly retained by the same locking bolts 49, is a radially extending disc member 50. The disc member 50 includes an inner axially aft extending, circumferential flange 51 formed integral therewith, and an outer axially aft extending circumferential flange 52 formed integral therewith. The periphery of each flange 51, 52 engages an annular seal member 54 maintaining the seal member 54 in tight sealing engagement against the upstream face of the rotor wheel disc 32A, and further defining an annular plenum chamber 56 between the disc member 50 and seal member 54. Compressor discharge cooling air enters the plenum 56 through a plurality of circumferentially spaced inlet ports 58 in the disc member 50 and exits through a plurality of circumferentially spaced connecting ports 60 in the seal member 54.

Turning now to FIGS. 2–4, and particularly FIG. 2, the dual dovetail blade attaching arrangement 61 of this invention is shown in substantial detail. Each of the blades 30 includes an airfoil vane section 62, together with a platform 64 from which a semi-circular root portion 66 extends in substantially an inward radial direction. A dovetail root portion 68 extends radially inward from the interior of the semi-circular root portion 66 from a point substantially intermediate the lateral ends of the semi-circle. Tang members 70, 72 extend inward from respective lateral ends of the semi-circular root portion 66.

The blades 30 are radially and axially retained by means of two circumferential, dovetail rails 74, 76 which extend radially outward from the periphery of the turbine wheel 32. The dovetail rails 74, 76 are axially spaced apart, with each rail being thickened at the outer radial end to provide outwardly extending shoulders. Each dovetail root 68 is thickened at the inner radial end to provide outwardly extending shoulders which upon blade insertion engage the inwardly facing shoulders of the opposing rails 74, 76. Also upon blade insertion, the tangs 70, 72 respectively engage the outwardly facing shoulders of the rails 74, 76. As can be most readily observed from reference to FIG. 4, the dovetail root portion 68 is offset from the tangs 70, 72 in order to provide optimum radial support for the air foil vane section 62.

Referring now to FIG. 3, there is shown the arrangement for the blade entrance slots. It can be seen that dovetail root 68 entrance slots 78, 80 are circumferentially offset from tang entrance slots 82, 84 in order to accommodate insertion of the individual blade members 30. Each blade 30 is inserted individually by simultaneously sliding the dovetail root portion 68 together with the tangs 70, 72 through their respective entrance slots. After insertion, each blade 30 is circumferentially slid around the dovetail rails 74, 76 into platform abutting relation with an adjacent blade until all the inserted blades circumferentially fill the dovetail rails. After the last blade is inserted, the entire circumferential row of blades is slid a limited distance around the dovetail rails 74, 76 in order that the insertion slots not be aligned with the respective root dovetails and tangs so as to insure radial restraint of all the blades during turbine operation.

The means for providing fluidic sealing between the semi-circular root portions 66 can best be seen by reference to FIG. 4. The opposed curved edges of each semi-circular root portion 66 include an arcuately extending notch 86 around the length thereof. Arcuately extending seal members 88 engage the opposing notches 86 of adjacent blades so as to provide fluidic sealing therebetween. The seal members are made curvilinear in cross-section so as to provide tight fluidic sealing engagement even for the situation where the notches 86 can not be aligned in direct opposing relation.

The dual dovetail blade attaching arrangement 61 accommodates the dual flow cooled turbine of this invention in the following manner. Referring now back to FIG. 2, it can be seen that the compressor discharge cooling airflow upon passing through the connecting ports 60 fills an annular plenum 90. The annular plenum 90 is defined by the aft face 92 of the seal member 54 in cooperation with the forward face 94 of an annular integral flange 96 extending in a near radial direction from the seal member 54. The outer periphery of the integral flange 96 engages the inside edge of an annular integral flange 98 extending radially inward from the edge of a circumferential integral ridge 100. The integral ridge 100 projects axially forward from the rotor wheel disc 32A and engages the aft face 92 of seal member 54 thereby defining the plenum 90. For engines operating at lower temperatures, strict confinement of the compressor discharge bleed cooling flow can be compromised by eliminating the integral flange 96, whereupon cooling flow becomes directed to the large plenum 101 confined between the annular seal member 54 and turbine wheel disc 32A.

Compressor discharge bleed air flow exits from the annular plenum 90 through a plurality of circumferentially spaced outlet ports 102, from whence the cooling air then goes to a second annular plenum chamber 104, the details of which can be seen by reference to FIG. 2A. The plenum 104 is defined by the aft face 92 of the seal 54 in combination with the inside lateral edge 106 of the semi-circular root portion 66. The inside lateral edge 106 also includes a radially inwardly extending integral flange 108, the forward face of which is engaged in tight sealing relation against the aft face of an annular integral flange 110 extending radially outward from the forward edge of the integral ridge 100, thereby completely defining the plenum 104. It should also be noticed that the aft face 92 of the seal 54 is also maintained in tight sealing relation to the semi-circular root portion 66.

Compressor discharge bleed cooling air flow exits from the plenum 104 through passages 112 in each semi-circular root portion 66. From each passage 112 the cooling air flow is then directed to a radial compartment 114 in the airfoil vane section 62 of the blade 30 as best shown in FIG. 3. Each compartment 114 extends axially from leading edge 105 of the airfoil vane 62 along the concave face of the airfoil. A plurality of perforations or openings 116 are provided in the leading edge region 105 of the airfoil vane. A plurality of openings 118 may also be provided in the tapered and thin trailing edge region 117, wherein the openings 118 are radially spaced and extend axially between the radial compartment 114 and substantially the entire trailing edge 117. These openings 116, 118 have very small cross-sectional areas, the diameters of the openings being in the order of 0.005 inch to 0.025 inch.

Compressor interstage cooling bleed air, upon traveling the radial extent of the annular plenum 44 between the turbine wheel discs 32A, 32B, is dumped into the area confined by the inner surface of the semi-circular root portion 66. The interstage cooling bleed airflow continues to be pumped or centrifuged radially outward into passages 120, 120' through the semi-circular root portion 66. Passages 120, 120' communicate with a compartment 122 which extends radially through the airfoil vane 62 of the blade 30 as best seen in FIG. 3. Compartment 122 extends axially along the convex side of the airfoil vane and communicates with exit flow holes 124 at the tip of the blades 62. The dual flow cooled turbine just described provides an extremely efficient cooling system. The critical leading edge region 105 together with the concave face of the airfoil vane 62 are the blade areas which must absorb the highest pressures of hot gas impingement from the combustor. The dual flow cooled turbine of this invention directs high pressure compressor discharge cooling airflow to these critical turbine blade areas where the high pressure of the cooling flow is most essential for efficient blade cooling. The hot gas stream impinging on the convex side of the airfoil vane section of the blades is generally at a lower pressure in comparison with the gas stream impinging on the leading edge and concave face of the airfoil vane, and consequently does not require as high a pressure cooling airflow. Therefore, the lower pressure compressor interstage bleed airflow becomes adequate for cooling the convex region of the airfoil vane. The use of a dual source of cooling airflow to cool a single row of turbine blades provides for an economy and efficiency of turbine cooling airflow which cannot be matched by the use of only a single cooling source.

Although the dual dovetail blade attaching arrangement previously described is of particular advantage for achieving the difficult sealing problems peculiar to the dual flow cooled turbine of this invention, the intended scope of invention is by no means intended to be limited by the details of this particular blade attaching arrangement. Other more conventional blade attaching arrangements could be adapted to accommodate the dual flow cooled turbine of this invention. Also, it is to be understood that the shape and configuration of the airfoil vane compartments and perforations previously described could be altered to suit various blade cooling requirements without departing from the intended scope of invention. Therefore, having described a preferred embodiment of the invention, though not exhaustive of all possible equivalents, what is desired to be secured by letters patent is claimed below.

What is claimed is:

1. In a gas turbine engine having a compressor, combustor and turbine in serial flow relation, a dual flow cooled turbine arrangement comprises:
   first means for bleeding a portion of the compressor air-flow at a point intermediate the inlet and discharge ends of the compressor,
   second means for bleeding a portion of the compressor airflow at a location downstream from the first bleed means where the pressure of the compressor airflow is greater than at the first means,
   a turbine wheel drivably connecting the compressor,
   a plurality of blades disposed in circumferentially spaced relation about the periphery of the turbine wheel wherein the interior of the airfoil vane of each blade includes a first hollow compartment for receiving compressor bleed cooling airflow from the first bleed means and directing the bleed air to cool those areas of the airfoil vane subject to the impingement of the lower pressures of hot gas from the combustor and a second hollow compartment for receiving the higher pressure compressor bleed cooling airflow from the second bleed means and directing the higher pressure bleed air to cool those areas of the airfoil vane subject to the impingement of the higher pressures of hot gas from the combustor,
   means for directing the compressor bleed airflow from the first bleed means to the turbine blades,
   and means for directing the compressor bleed airflow from the second bleed means to the turbine blades.

2. The dual flow cooled turbine arrangement of claim 1 wherein the second bleed means is arranged to bleed a portion of the compressor airflow discharged from the compressor.

3. The dual flow cooled turbine arrangement of claim 2 wherein the means for bleeding a portion of the compressor interstage airflow and directing the airflow back to the turbine blade includes:

a bleed port from the compressor at a point intermediate the inlet and discharge ends of the compressor;

a hollow drive shaft interconnecting the turbine and compressor, the hollow interior of which is in flow communication with the bleed port for receiving the compressor interstage bleed cooling air and directing the cooling airflow aft to the turbine; and a radially extending annular first plenum through the turbine wheel for receiving the compressor interstage bleed cooling air and directing the cooling air to the first hollow compartment of each airfoil vane.

4. The dual flow cooled turbine arrangement of claim 3 wherein the means for bleeding a portion of the compressor discharge airflow and directing the airflow back to the turbine blade includes:

an interior cylindrical partition interposed radially between the combustor and interconnecting shaft defining an axially extending annular second plenum between the partition and interconnecting shaft, a bleed port through the cylindrical partition for bleeding a portion of the compressor discharge airflow wherein the compressor discharge bleed air flows the length of the axially extending plenum and the interconnecting shaft operates as a heat exchanger providing for the transfer of heat from the higher temperature compressor discharge bleed air to the lower temperature compressor interstage bleed air.

5. The dual flow cooled turbine of claim 4 including an annular seal member sealingly engaged to the turbine wheel and turbine blades so as to define a third plenum chamber therebetween and including a plurality of inlet ports for directing the discharge cooling airflow through the third plenum and into the second hollow compartment of each airfoil vane.

6. The dual flow cooled turbine of claim 2 wherein means for attaching the blades to the turbine wheel comprises:

two circumferential and axially spaced dovetail rails extending radially outward from the periphery of the turbine wheel with each rail thickened at the outer radial end to provide outwardly extending shoulders wherein slots are provided through the shoulders to accommodate individual blade insertion;

a semi-circular root portion extending in a substantially inward radial direction from the base of the airfoil vane of each blade;

a dovetail root portion extending radially inward from the interior of the semi-circular root portion from a point substantially intermediate the lateral ends of the semi-circle and thickened at the inner radial end to provide outwardly extending shoulders, tang members extending radially inward from the respective ends of the semi-circular root portions such that upon blade insertion within the slots, each blade may be circumferentially slid so that the outwardly extending shoulders of the dovetail root engage the inwardly facing shoulders of the opposing rails and the tangs respectively engage the outwardly facing shoulders of the rails.

7. The dual flow cooled turbine of claim 6 wherein:

the turbine wheel includes a radially extending annular first plenum through the turbine wheel for receiving the compressor interstage bleed cooling air whereupon the interstage bleed cooling air may be centrifuged along the radial extent of the first plenum and dumped from the outer periphery of the turbine wheel into the area confined by the inner surface of the semi-circular root portion, an annular seal member is sealingly engaged to the turbine wheel and blade root portions so as to define a second plenum chamber therebetween including a plurality of inlet ports for directing the compressor discharge bleed cooling air into the second plenum, the semi-circular root portions include first passages therethrough communicating from the first hollow compartment of each airfoil vane to the inner surface of each semi-circular root portion for receiving and directing interstage bleed cooling air into the first compartment, and second passages therethrough communicating from the second hollow compartment of each airfoil vane to the lateral edge of each semi-circular root portion for receiving and directing compressor discharge bleed cooling air into the second compartment.

8. In a gas turbine engine having a dual source of cooling flow means for attaching the blades to the turbine wheel comprise:

two circumferentially and axially spaced dovetail rails extending radially outward from the periphery of the turbine wheel with each rail thickened at the outer radial end to provide outwardly extending shoulders wherein slots are provided through the shoulders to accommodate individual blade insertion;

a semi-circular root portion extending in a substantially inward radial direction from the base of the airfoil vane of each blade;

a dovetail root portion extending radially inward from the interior of the semi-circular root portion from a point substantially intermediate the lateral ends of the semi-circle and thickened at the inner radial end to provide outwardly extending shoulders;

tang members extending radially inward from the respective ends of the semi-circular root portions such that upon blade insertion within the slots, each blade may be circumferentially slid so that the outwardly extending shoulders of the dovetail root engage the inwardly facing shoulders of the opposing rails and the tangs respectively engage the outwardly facing shoulders of the rails.

* * * * *